United States Patent

Kosen

[15] 3,651,314
[45] Mar. 21, 1972

[54] FEEDRATE COMPUTER USING A READ ONLY MEMORY

[72] Inventor: Marion Kosen, Wickliffe, Ohio
[73] Assignee: Allen-Bradley Company, Milwaukee, Wis.
[22] Filed: Jan. 22, 1970
[21] Appl. No.: 881,397

[52] U.S. Cl..........................235/151.11, 340/172.5, 235/156
[51] Int. Cl..........................................G05b 19/18, G06c 3/00
[58] Field of Search..................235/151.11, 152; 318/571

[56] References Cited

UNITED STATES PATENTS

| 3,308,279 | 3/1967 | Kelling | 235/151.11 |
| 3,328,767 | 6/1967 | Ottaway | 340/172.5 |
| 3,370,239 | 2/1968 | Seki et al. | 328/155 |
| 3,128,374 | 4/1964 | Ho et al. | 235/152 IE |
| 3,479,574 | 11/1969 | Kosem | 235/151.11 X |

Primary Examiner—Eugene G. Botz
Attorney—Arnold T. Ericsen and Richard C. Steinmetz

[57] ABSTRACT

An arrangement for the numerical control of a machine tool is provided wherein, instead of a feedrate number being entered into the system, the desired velocity in inches per minute is entered. Provision is further made for a feedrate computer which computes the value of 1/D from the departure information provided for the various machine tool axes. Provision is then made to compute the feedrate number which equals V/D, which is then applied to the contour generator which controls the operation of the machine tool with its output.

8 Claims, 4 Drawing Figures

INVENTOR
MARION KOSEM
BY Lindenberg & Freilich
ATTORNEYS

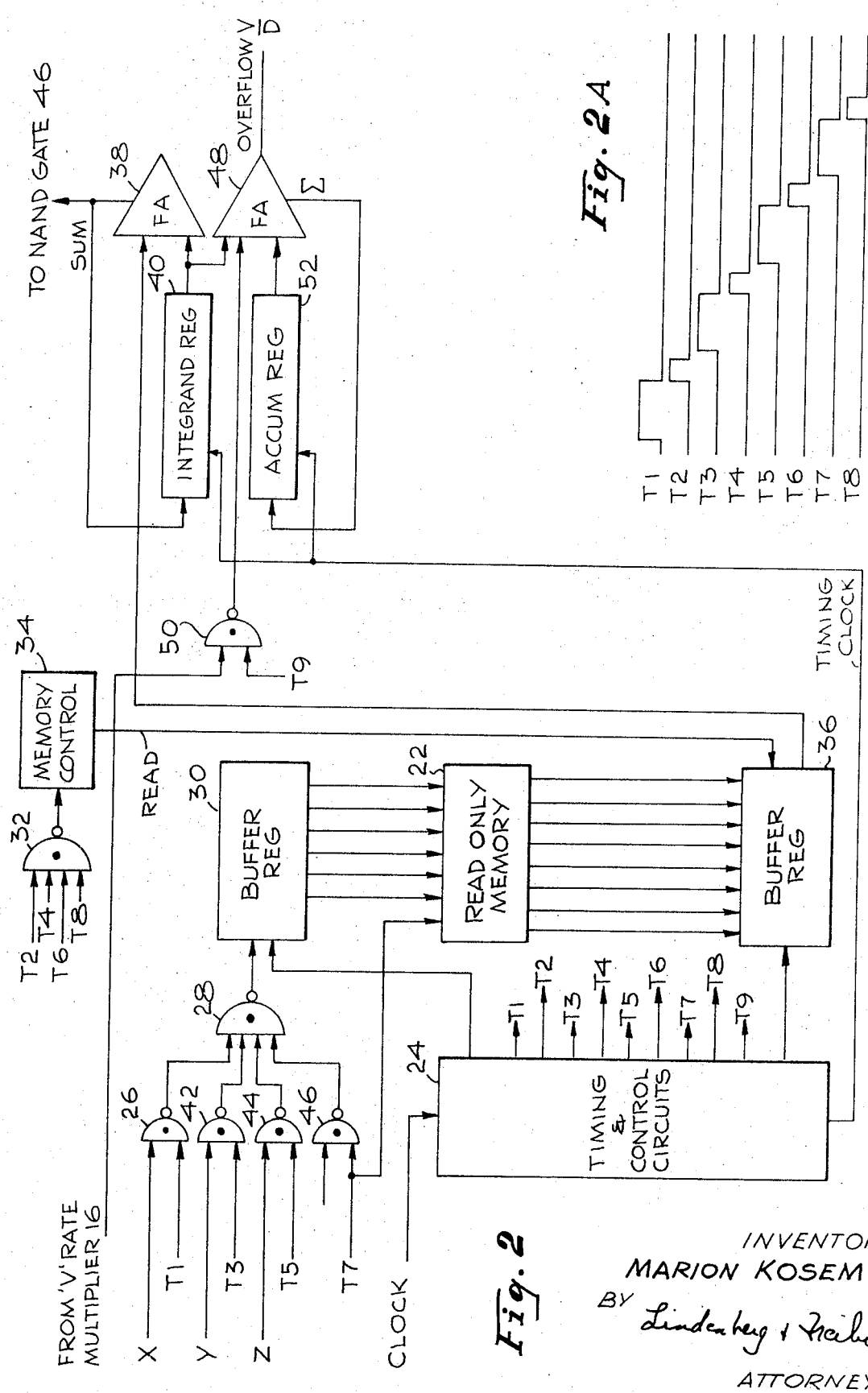

FEEDRATE COMPUTER USING A READ ONLY MEMORY

BACKGROUND OF THE INVENTION

This invention relates to a numerically controlled machine tool system, and more particularly to an improved feedrate computing arrangement therefor.

In a numerically controlled machine tool, such as a numerically controlled contouring system, movement of the machine tool or the machine tool table, as the case may be, from one point to another is normally specified by three orthogonal components, $x$, $y$ and $z$. When these components are applied to a three-axis contour generator, then the velocity of each axis is proportional to the magnitude of its component and the input frequency to the contour generator.

In order that the machine tool maintain a constant path velocity for any choice of $x$, $y$ and $z$, the input frequency to the contour generator must have a value of $f_0 \times V/D$, where $f_0$ is the constant frequency of a clock oscillator, V is the desired path velocity in inches per minute, and D is computed from $x$, $y$ and $z$ and has the value $D = \sqrt{x^2+y^2+z^2}$.

The fraction V/D is the term called the feedrate number or FRN. For each set of axis commands, the distance D is computed and thereafter, for a selected velocity, the FRN is computed. The FRN number is entered into the control system together with the axis departure information.

Tables which are provided to machine tool operators to provide cutting rates only provide information as to the cutting velocity permitted with the material of which a workpiece is made. Therefore, it is necessary to precalculate the FRN for each path to be cut, with presently known numerically controlled machine tools. This is a time consuming nuisance and can be a source of serious error.

An object of this invention is the provision of a numerically controlled machine tool system which permits the direct entry of velocity in inches per second.

Another object of this invention is to provide a numerical control system for a machine tool having a novel arrangement for determining the FRN value to be applied to the contour generator.

The foregoing and other objects of the invention may be achieved by using the $x$, $y$ and $z$ axis departure values as the address information for a read only memory. In one embodiment of the invention, the values for $x^2$, $y^2$ and $z^2$ are entered into the read only memory and then the value of $$\frac{1}{\sqrt{x^2+y^2+z^2}}$$

In another embodiment of the invention, the read only memory is simultaneously addressed by the values of $x$, $y$ and $z$, and its output is the value $$\frac{1}{\sqrt{x^2+y^2+z^2}}$$

In both cases, the product of the velocity input V times the calculated 1/D is then generated, which is the feedrate number FRN, and this is applied to the contour generator of the system.

The novel features of the invention are set forth with particularity in the appended claims. The invention will best be understood from the following description when read in conjunction with the accompanying drawings.

BRIEF DESCRIPTION OF THE DRAWINGS

FIG. 2 is a block diagram of an embodiment of this invention;

FIG. 2A is a timing waveform diagram used to assist in an understanding of the operation of FIG. 2.

DESCRIPTION OF THE PREFERRED EMBODIMENTS

Figure 1:
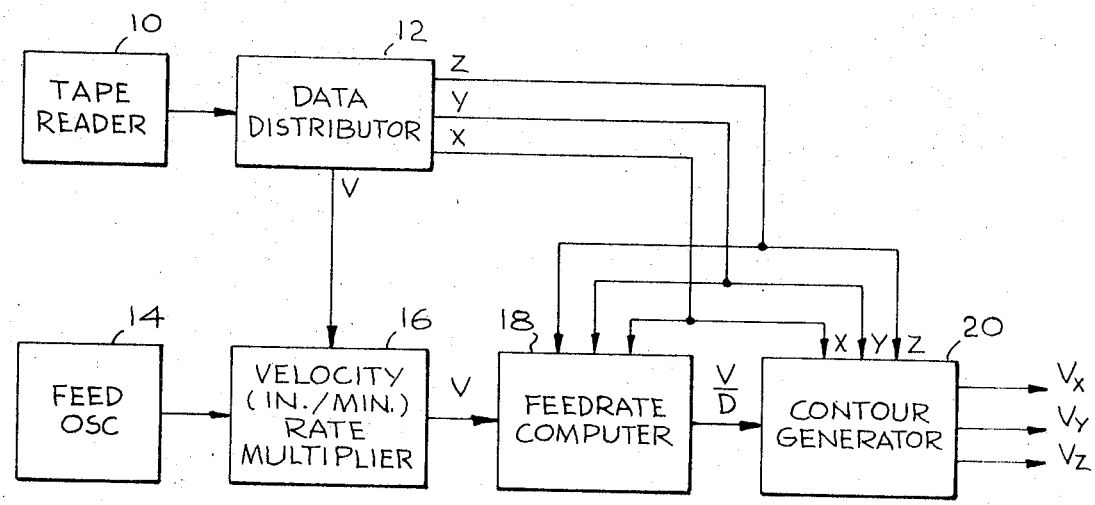
FIG. 1 is a block schematic drawing showing an arrangement for a numerical control system embodying this invention.

Referring now to FIG. 1 of the drawings, there may be seen a considerably simplified arrangement for a numerical control system which is employed for controlling a machine tool. The reason for the absence of a showing of detail is because the details are well known to those skilled in the art and the showing of these is not necessary for those skilled in the art to understand and appreciate the invention. The data for controlling the machine tool is read from either punched tape or magnetic tape by a tape reader 10. The data read by the tape reader is applied to a data distributor 12, which distributes the various commands to the machine tool control system including the $x$, $y$ and $z$ departure commands. However, in accordance with this invention, instead of a feedrate number, the desired velocity is distributed.

The basic clock source for the system is also known as the feed oscillator 14. This drives a rate multiplier 16 into which the velocity from the data distributor is entered. The rate multiplier is a well known circuit, such as a digital differential integrator or a counter with gates at the counter outputs for selecting counts in accordance with the value of the velocity. Accordingly, the output of the velocity rate multiplier 16 is a pulse train wherein the number of pulses occurring within a predetermined interval is determined by the value of the velocity. The output of the velocity rate multiplier is applied to a feedrate computer 18 which receives as another input the departure data $x$, $y$ and $z$. The feedrate computer calculates the value of I/D and then multiplies this by the velocity V input, so that its output is the fraction V/D or FRN. The output of the feedrate computer is applied to the contour generator 20, which also receives the departure data from the data distributor.

The contour generator, which usually comprises a rate multiplier for each axis, from the input information can then provide as its output the three pulse trains $V_x$, $V_y$ and $V_z$ which are applied to the three servo motors controlling the three axes of the machine tool.

Referring now to FIG. 2, there may be seen a block schematic diagram of the feedrate computer 18 which comprises the embodiment of this invention. The basic component of the feedrate computer is a read only memory 22, usually designated as ROM. As is well known, a read only memory is a device in which data is stored permanently at the time of manufacture. The information stored in the memory is read out in response to digital signals known as address signals. The information read out from the ROM is not destroyed or disturbed as a result of the readout, as is the situation with magnetic core memories, and consequently no rewriting cycle is necessary. Read only memories are commercially available and, as indicated, when manufactured can store any information desired to be entered therein. In the present invention, the read only memory is used to provide, in response to its input address, the value of the square of that input. Thus, if the input is $x$, this indicates an address in the memory which when read out provides the value $x^2$; similarly for the $y$ and $z$ functions. Finally, the memory, when subsequently addressed with the value of $x^2+y^2+z^2$, produces an output 1/D.

The basic timing for the operation of the apparatus shown in FIG. 2 is the function of the timing and control circuits 24. These can be any known arrangement of counters and gates which, in response to the basic clock of the numerical control system, provides output pulses, specific ones of which are here designated as T1 through T9, as well as other pulses for operating buffer registers, the memory readout control, and other apparatus used in the system. Again, the timing and control circuits or the basic clock arrangements for securing the proper sequences of operations are well known to those skilled in the art and therefore will not be further discussed here. The sequence and relative widths of these timing pulses are shown in FIG. 2A, which is a timing waveform diagram.

Upon the occurrence of a T1 clock pulse out of the timing and control circuits 24, a NAND-gate 26 is enabled to enter a train of pulses representing the value of the $x$-axis departuee, from the data distributor 12, through the NAND-gate 28, which here operates as an OR gate, into a buffer register 30. The buffer register acts to convert the serially received information into parallel information. The buffer register 30 also acts as the address register for the read only memory 22.

Upon the termination of the T1 pulse, the timing and control circuits provide a T2 pulse. This is applied to a NAND-gate 32. The output of the NAND-gate 32 in response to the applied T2 pulse enables the memory readout control circuits 34 to read out of the memory the data stored at the address which is in the buffer register 30. This data is entered into an output buffer register 36. Since the address in the buffer register 30 was the value of $x$, the data read out of the read only memory into the buffer register 36 is the value $x^2$.

Thereafter, the data from the buffer register 36 is read into a differential digital integrator. This is well known circuitry which includes a full adder 38 having two inputs, one of which is provided by the serial output of the buffer register 36 and the other of which is provided by the serial output of a register 40 called an integrand register. The sum output of the two inputs to the full adder 38 is applied to the input to the integrand register 40. The timing for the operation of emptying the buffer register 36 and filling the integrand register 40 with the sum output of the full adder 38 is provided by pulses from the timing and control circuits 24. At the outset, the contents of the integrand register 40 are zero; at the end of a cycle of operation of emptying the buffer register 36, the buffer register contents will be in the integrand register 40.

Upon the occurrence of clock pulse T3, a NAND-gate 42 is enabled to enter the y departure information into the buffer register 30 through the NAND-gate 28. Upon the occurrence of a T4 clock pulse, the memory readout control circuit 34 is enabled to read out of the ROM the value of $y^2$, which is entered into the buffer register 36.

The buffer register 36 then has its serialized input entered into the full adder 38. This time the integrand register 40 contains the value $x^2$ so that the full adder 38 will produce as its sum output the value of $x^2+y^2$. This is entered into the integrand register 40 and takes the place of the value of $x^2$ which is stepped out into the full adder 38 in the course of the addition.

Next, at time T5, a NAND-gate 44 is enabled to transfer the $z$ departure information through NAND-gate 28 into the buffer register 30. At time T6, NAND-gate 32 enables the memory readout control circuit 34 to read out the value of $z^2$ into the buffer register 36 in response to the input address $z$. Thereafter, the contents of buffer register 36 are added to the contents of the integrand register 40 by means of the adder 38. The integrand register now contains the sum $x^2+y^2+z^2$.

Upon the occurrence of a T7 clock pulse, the NAND-gate 46 is enabled to enter the contents of the integrand register 40 through NAND-gate 28 into the buffer register 30. Thereafter, upon the occurrence of a T8 clock pulse, the memory readout control circuit 34 enables the data stored at the location addressed in the memory by the sum of $x^2+y^2+z^2$, which equals $$\frac{1}{\sqrt{x^2+y^2+z^2}}=\frac{1}{D},$$

to be read into the buffer register.

The buffer register 36 thereafter is enabled to transfer its contents into the integrand register 40, the contents of the integrand register 40 having been cleared when they were transferred into the buffer register 30.

The digital integrator next is operated in well known fashion as a rate multiplier to produce a pulse train as the overflow output of a full adder 48. This full adder receives as one input the output of the integrand register 40 corresponding to the function 1/D.

At this time, a clock pulse T9 enables a NAND-gate 50 to pass V-rate multiplier pulses, whereby the full adder 48 can add the serial outputs of the integrand register 40 and the accumulator register 52 which is customarily employed with a digital integrator. Further, in well known fashion, the sum output of the full adder 48 is circulated back into the accumulator input 52, and the sum output of the full adder 38 is circulated back into the input of the integrand register 40. The integrand and accumulator registers 40 and 52 are allowed to circulate for as many cycles as there are pulses received from the V-rate multiplier. As a result, the overflow output of the full adder 48 will be a pulse train representative of the value V/D=FRN. This is the output which is fed to the contour generator 20 (FIG. 1 of the system.

In summary of the foregoing, the values of $x$, $y$ and $z$ are successively used to address the read only memory 22 which successively reads out in response to the values $x^2+y^2+z^2$. The integrand register 40 of the digital integrator is used for adding $x^2+y^2+z^2$. This value is then used for addressing the read only memory 22. The read only memory 22 in response produces an output which is the value of $$\frac{1}{\sqrt{x^2+y^2+z^2}}=\frac{1}{D}.$$

This value is then entered into the digital integrator, which is then operated in response to the pulse train representative of the value of V to produce a pulse train output representative of the value V/D = FRN.

Figure 3:
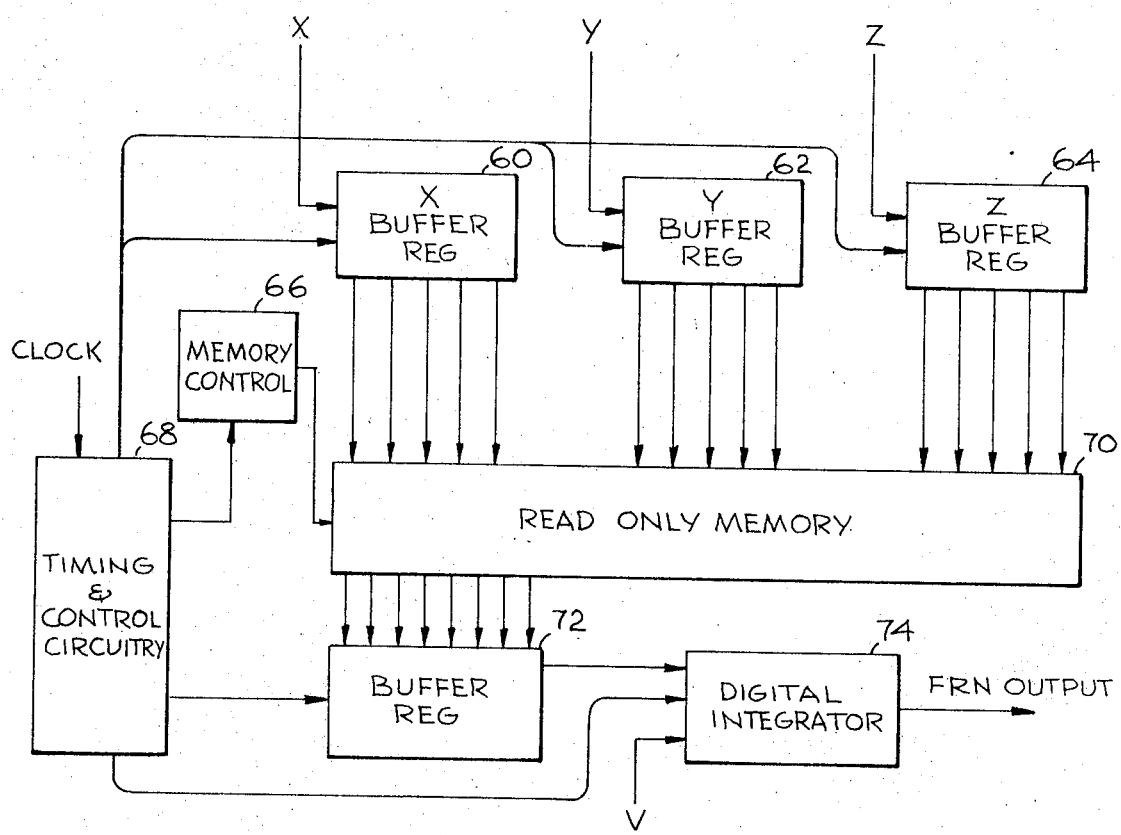
FIG. 3 is a block diagram of another embodiment of the invention.

An alternate method of implementing the conversion from $x$, $y$ and $z$ to 1/D is to use a larger ROM. A block schematic diagram for doing this is shown in FIG. 3. Here, the values of $x$, $y$ and $z$ are directly entered from the data distributor 12 into respective $x$ buffer register 60, $y$ buffer register 62, and $z$ buffer register 64. The memory control 66 then receives a clock pulse from the timing and control circuit 68 which enables the read only memory 70 to read out the value of 1/D directly into the buffer register 72. Thereafter, the contents of the buffer register 72 are entered into the digital integrator 74. The digital integrator 74 is then operated in response to the V representative pulse train to produce an FRN output in the manner described in connection with FIG. 2.

From the foregoing description it should be appreciated that a novel and useful arrangement for a numerical control system for operating a machine tool is provided whereby the desired velocity information is directly entered into the system. The value of 1/D which is precalculated and set into a read only memory is read out of that memory in response to the values of $x$, $y$ and $z$, the usual departure data, used as a single address or as addresses for that memory. Thereafter, provision is made for multiplying the quantities V and 1/D to provide the contour generator 20 (FIG. 1) with the required pulse train representative of the value of V/D.

The embodiments of the invention in which an exclusive property or privilege is claimed are defined as follows:

1. In a numerical control system for a machine tool of the type wherein departure data is provided in the form of the value of a desired distance along each axis, and also the value of a desired velocity V is provided, the improvement comprising:

means for generating a pulse train representative of the feedrate number equal to V/D, where D equals the square root of the sum of the squares of the departure distances, comprising a memory means having stored therein different values of 1/D at different address locations, means for addressing the address locations of said memory means with said departure data to read out of said memory means the value of 1/D corresponding to the value of said departure data, and means for multiplying the value of 1/D read out of said memory by the value of V for producing a pulse train representative thereof.

2. In a numerical control system as recited in claim 1 wherein said memory means comprises a read only memory.

3. In a numerical control system as recited in claim 1 wherein said means for addressing the address locations of said memory means with said departure data includes means for sequentially addressing said memory with departure data for each axis.

4. In a numerical control system as recited in claim 1 wherein said means for addressing the address locations of said memory means with said departure data includes means for simultaneously addressing said memory with the departure data for each axis.

5. In a numerically controlled machine tool of the type wherein the information for achieving a desired departure D is provided in the form of axis departure information $x$, $y$ and $z$ for each axis, and there is provided information as to the desired velocity V for said machine tool during said departure, an improved means for determining the feedrate number to be used by said numerically controlled machine tool comprising:
   a read only memory means for storing at a plurality of memory locations addressable by $x$, $y$ $z$ and $x^2+y^2+z^2$, respectively, the values $x^2$, $y^2$, $z^2$ and $$\frac{1}{\sqrt{x^2+y^2+z^2}}=\frac{1}{D},$$

means for sequentially addressing said read only memory means with the departure data $x$, $y$ and $z$,
   means for adding the sequential data read out from said memory as result of it being respectively addressed to provide the sum $x^2+y^2+z^2$,
   means for addressing said memory with the sum $x^2+y^2+z^2$ to obtain a read out 1/D, and
   means for multiplying the value of 1/D by V to obtain V/D equal to the feedrate number.

6. Apparatus as recited in claim 5 wherein said means for multiplying 1/D times V comprises oscillator means for producing an output having a frequency $f$, rate multiplier means, means for applying the value of V and the output of said oscillator to said rate multiplier means to produce a pulse train representative of the product of the frequency $fV$, and digital integrator means to which $fV$ and 1/D are applied to produce an output representative of the feedrate number.

7. In a numerically controlled machine tool of the type wherein the information for achieving the desired departure D is provided in the form of axis departure information $x$, $y$ and $z$ for each axis, and there is provided information as to the desired velocity V for said machine tool during said departure, an improved means for determining the feedrate number to be used by said numerically controlled machine tool comprising:
   a read only memory means for storing at a plurality of memory locations addressable by $x$, $y$ and $z$ the value of $$\frac{1}{\sqrt{x^2+y^2+z^2}}=\frac{1}{D},$$

means for addressing said read only memory simultaneously with the departure data $x$, $y$, and $z$ to obtain a readout of 1/D, and
   means for multiplying the value of 1/D by V to obtain V/D = feedrate number.

8. Apparatus as recited in claim 7 wherein said means for multiplying the value of 1/D by V comprises:
   a read only memory means for storing at a plurality of memory locations addressable by $x$, $y$, $z$ and $x^2+y^2+z^2$, respectively, the values $x^2$, $y^2$, $z^2$ and $$\frac{1}{\sqrt{x^2+y^2+z^2}}=\frac{1}{D},$$

means for sequentially addressing said read only memory means with the departure data $x$, $y$ and $z$,
   means for adding the sequential data read out from said memory as a result of being respectively addressed to provide the sum $x^2+y^2+z^2$,
   means for addressing said memory with the sum $x^2+y^2+z^2$ to obtain a readout 1/D, and
   means for multiplying the value of 1/D by V to obtain V/D equal to the feedrate number.

* * * * *